March 6, 1928.

S. ALLEN 1,661,916

HOT TAMALE FORMING MACHINE

Filed April 5, 1926   2 Sheets-Sheet 1

Inventor:
Samuel Allen.
By Fred'k J. Larson,
Attorney.

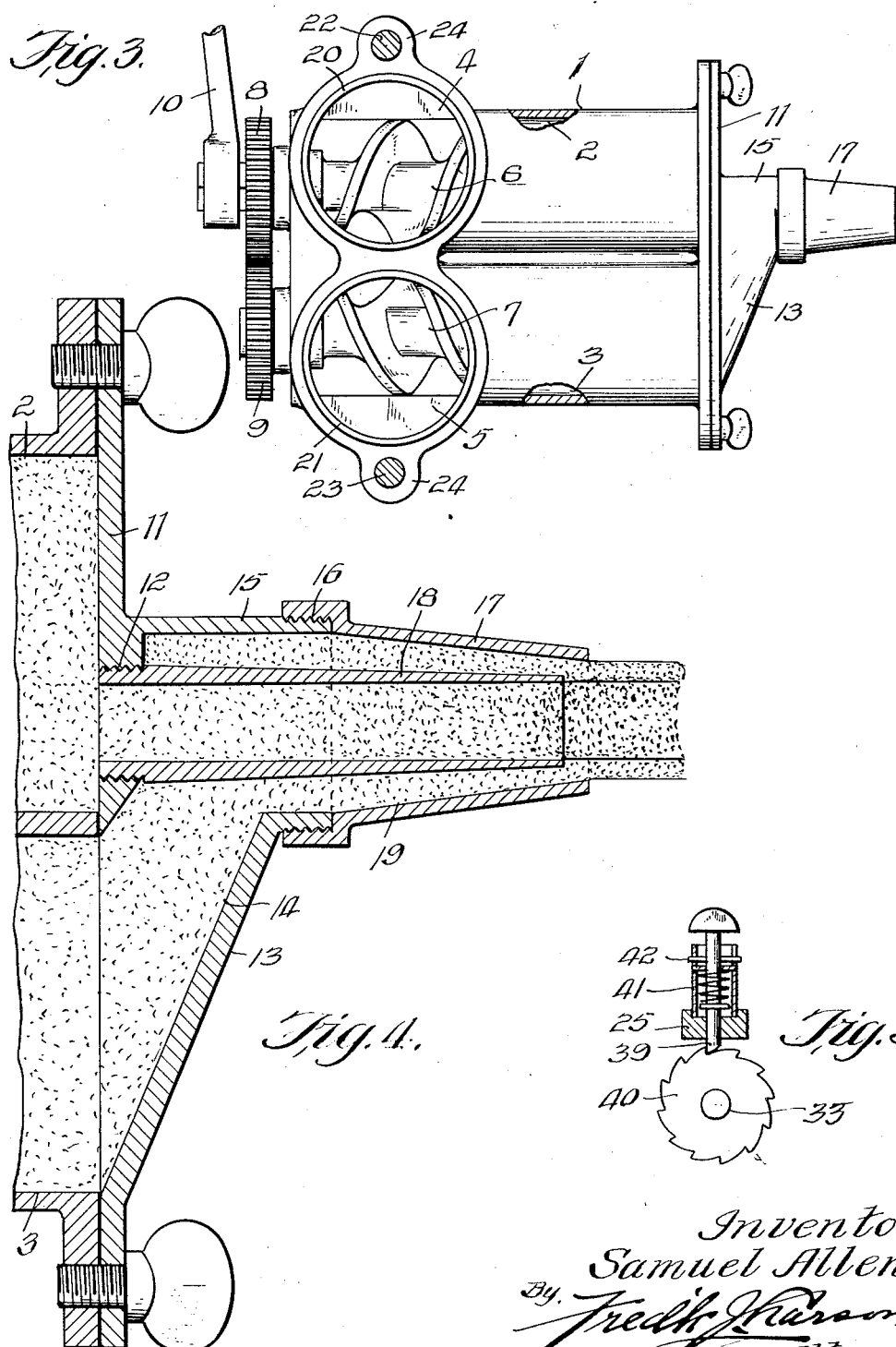

Patented Mar. 6, 1928.

1,661,916

UNITED STATES PATENT OFFICE.

SAMUEL ALLEN, OF JONESBORO, ILLINOIS.

HOT-TAMALE-FORMING MACHINE.

Application filed April 5, 1926. Serial No. 99,774.

My invention relates to hot tamale forming machines, and, has for its object to provide a machine having a pair of supply cylinders, one for meat and the other for meal provided with pistons under pressure for discharging the contents of the tubes uniformly to worm conveyors and then through a pair of concentrically arranged nozzles for forming the tamales.

A further object of the invention is the provision of means for elevating the pistons and retaining them in their elevated position until released for use again.

A further object of the invention is to provide a hot tamale forming machine, which possesses advantages in points of simplicity and efficiency, and, at the same time proves itself comparatively inexpensive in manufacture.

With the above and other objects in view, the invention consists in the novel features of construction, arrangement and combination of parts hereinafter more fully described and finally pointed out in the claims hereto appended.

In the further disclosure of the invention, reference is to be had to the accompanying drawings forming a part of this specification, wherein like characters of reference denote similar parts throughout the several views:

Fig. 3, is a cross sectional view taken on line 3—3 of Fig. 1.

Fig. 4, is a cross sectional view taken longitudinally through the nozzles and the discharge ends of the conveyor casing.

Fig. 5, is a detail of the piston hoisting mechanism.

Figure 1:
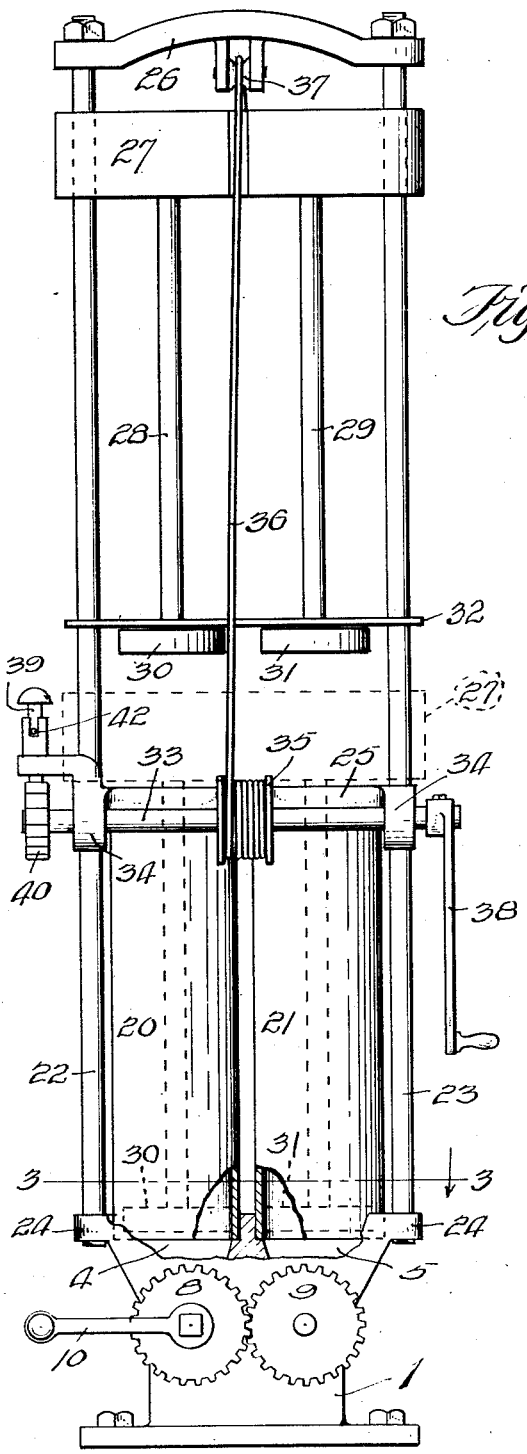
Fig. 1, is a front elevation of a hot tamale forming machine embodying the features of my invention.

Referring to the drawings, the reference character 1 designates a casing having a pair of opposed parallel arranged horizontally disposed cylinders 2 and 3 provided at one end with the vertically disposed receiving hoppers 4 and 5, respectively. Revolubly disposed within the cylinders 2 and 3 are the right and left hand screw conveyors 6 and 7, respectively, which are driven in opposite directions by means of the meshing gears 8 and 9, respectively. The gears are manually rotated by means of a suitable handle 10 having connection with one end of one of the screw conveyors, as shown in Figs. 1 and 3.

A closure nozzle plate 11 is suitably and removably fixed to the discharge end of the casing 1 and is provided with screw threaded opening 12 communicating with the discharge end of cylinder 2. The plate is further provided with a neck 13 provided with a suitable inclined passage 14 which communicates with the discharge end of cylinder 3. The neck 13 is provided with a cylindrical head 15 provided with the external screw threads 16 to which is attached a suitable tapered meal discharge nozzle 17. Screw threadedly connected with the opening 12 of the plate 11 is a meat discharge nozzle 18 which is disposed within the head 15 and nozzle 17 and spaced therefrom to provide a meal passage 19. The inner end of the meat discharge nozzle 18 communicates with the cylinder 2 and the outer edge thereof is disposed a suitable distance to the rear of the outer edge of the meal discharge nozzle so as to permit the meal to surround the meat discharged from nozzle 18 to provide a meal coating therefor, as is apparent from Fig. 4. Nozzles of various sizes may be applied to the plate 11, as desired.

The reference numerals 20 and 21 designate suitable vertically disposed cylindrical meat and meal supply, or feed hoppers, respectively. These hoppers are suitably fixed at their lower ends to the meat and meal receiving hoppers 4 and 5 of the casing 1 and communicate therewith for supplying meat and meal to the casing cylinders and conveyors therein. These hoppers 20 and 21 may be of any desired height so as to hold a supply of meat and meal, as is manifest.

A pair of suitable vertically disposed guide rods designated 22 and 23 are suitably connected at their lower ends to a pair of suitable ears 24 directed laterally from the walls of the receiving hoppers 2 and 3. These rods are further supported and guided by means of a collar 25 fixed to the upper ends of the supply cylinders 20 and 21 through which they pass. The rods 22 and 23 extend upwardly above the tops of the supply cylinders a suitable distance and are finally connected at their upper ends by means of a cross-bar 26.

Figure 2:
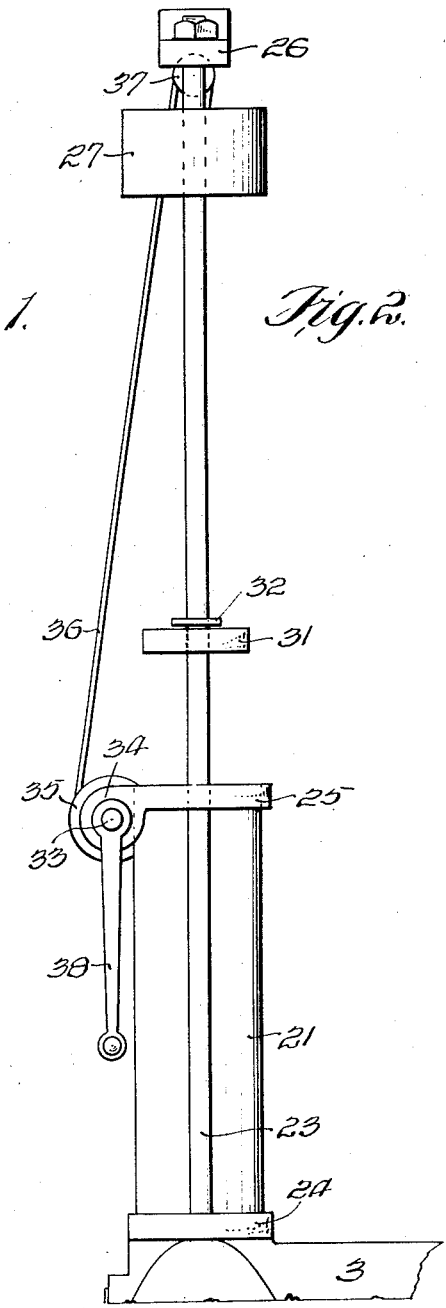
Fig. 2, is a side elevation thereof, with portions thereof broken away.

A suitable weight 27 is slidably mounted upon the guide rods 22 and 23, as shown in Figs. 1 and 2. Connected to the weight 27 and depending therefrom are a pair of rods 28 and 29 which have their lower ends provided with suitable pistons 30 and 31, respectively. A suitable guide plate 32 is also slidably mounted upon the guide rods 22 and 23 and through which loosely pass the piston rods 28 and 29, so that the plate will rest upon the pistons 30 and 31 and prevent spreading displacement thereof. The pistons 30 and 31 are receivable in the supply cylinders 20 and 21, respectively for automatically forcing the meat and meal into the receiving hoppers 2 and 3 to be conveyed to the discharge nozzles by means of the screw conveyors 6 and 7, respectively.

The means for raising, or elevating the pistons 30 and 31 to their uppermost position out of the cylinders 20 and 21 for refilling said cylinders with a new supply of meat and meal, consists of a shaft 33 journaled in the bearings 34 of the collar 25. A suitable grooved pulley wheel 35 is fixed to the shaft 33 and to which is fixed one end of a cable 36. The cable 36 is directed upwardly from the pulley 35 and rides over a suitable pulley 37 fixed to the cross-bar 26 and then the upper end of the cable is suitably fixed to the weight 27 so that the weight can be raised from its lowermost position shown in dotted lines in Fig. 1 to its uppermost position shown in full lines by means of the handle 38 fixed to one end of the pulley shaft 33.

The means to prevent the weight from falling when held in its uppermost position for refilling the supply cylinders 20 and 21 consist of a plunger 39 engaging at its lower end with the teeth of a suitable ratchet wheel 40 fixed to one end of the cable shaft 33. The plunger 39 is yieldingly supported within a sleeve 41 fixed to the collar 25 adjacent the ratchet wheel 40 and it is provided with a cross pin 42 near its upper end which engages in vertically disposed slotted openings in the wall of the sleeve when the plunger is in engagement with the ratchet. After the supply cylinders have been filled, or refilled, the operator raises the plunger with his fingers from contact with the ratchet 40 and causes the cross pin 42 to engage, or rest upon the upper face of the sleeve 41 to bring the lower end of the plunger 41 out of contact with the teeth of the ratchet 40. This permits the weight 27 to exert its pressure upon the pistons which are in contact with the meat and meal within the supply chambers for automatically feeding the meat and meal uniformly to the receivng hoppers 2 and 3 and the conveyors 6 and 7, so that both cylinders will be empty at the same time due to the area of both the meat and meal discharge nozzles being of the same capacity.

From the foregoing description, it will be apparent that when the supply hoppers 20 and 21 are filled with meat and meal, respectively, and the pistons are lowered to engage the top thereof, the weight 27 will supply the necessary pressure to the pistons to feed the contents of the supply hoppers to the worm conveyors as they are revolved by means of the handle fixed to one of the conveyors. It will also be observed that the meat will be discharged through inner nozzle 18 while the meal will be discharged through the outer nozzle 17 for coating the meat with meal, as the meat leaves the nozzle 18.

It will also be observed that the supply of meat and meal will be discharged uniformly so that both hoppers will be emptied at the same time, and further that when the supply hoppers have been emptied that the weight and pistons can be raised by means of the cable 36 by turning the crank handle 38 so that the supply hoppers can again be filled.

The many advantages of the herein described invention will readily suggest themselves to those skilled in the art to which it appertains.

I do not desire to be understood as limiting myself to the exact details of construction and arrangement of parts as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. In a machine for forming hot tamales, a casing to provide two independent cylinders arranged side by side, a discharge nozzle for each cylinder one surrounding the other, screw conveyors within said cylinders, intermeshing gears for revolving said conveyors at the same speed in opposite directions, receiving hoppers for said cylinders, supply hoppers supported by said receiving hoppers and pistons vertically movable within the supply hoppers.

2. In a machine for forming hot tamales, a casing to provide two independent cylinders arranged side by side, a discharge nozzle for each cylinder one surrounding the other, screw conveyors within said cylinders, intermeshing gears for revolving said conveyors at the same speed in opposite directions, receiving hoppers for said cylinders, supply hoppers supported by said receiving hoppers, pistons vertically movable within the supply hoppers and means for elevating the pistons to a position above the hoppers.

3. In a machine for forming hot tamales, a casing to provide two independent cylinders arranged side by side, a discharge nozzle for each cylinder one surrounding the other, screw conveyors within said cylinders, intermeshing gears for revolving said conveyors at the same speed in opposite directions, receiving hoppers for said cylinders, supply hoppers supported by said receiving hoppers, pistons vertically movable within the supply hoppers, a vertically movable weight, connections between the weight and the pistons and said weight being disposed above the pistons for exerting pressure upon the pistons to force the contents of the supply hoppers into the receiving hoppers and from where it is moved through the cylinders by the screw conveyors and means for elevating the pistons to a position above the supply hoppers.

4. In a machine for forming hot tamales, a casing having two independent cylinders arranged side by side, a discharge nozzle for each cylinder one surrounding the other, screw conveyors within said cylinders, intermeshing gears for revolving said conveyors at the same speed in opposite directions, reeciving hoppers for said cylinders, supply hoppers supported by said receiving hoppers, pistons vertically movable within the supply hoppers, a vertically movable weight, connections between the weight and the pistons and said weight being disposed above the pistons for exerting downward pressure upon the pistons to force the contents of the supply hoppers into the receiving hoppers and from where it is moved through the cylinders by the screw conveyors.

5. A hot tamale forming machine comprising a casing having two independent cylinders arranged side by side, a screw conveyor within each cylinder, intermeshing gears for revolving the conveyors at the same speed in direction toward each other, a receiving hopper for each cylinder, a supply hopper for each reeciving hopper, one supply hopper adapted to contain meat and the other meal, a discharge nozzle for each casing cylinder and one of said nozzles being disposed within the other nozzle and spaced therefrom to provide a passage therearound, a pair of guide rods supported by the casing, a collar fixed to the upper ends of the supply hoppers through which said rods pass, a cross-bar for uniting the rods at their upper ends, a weight slidably mounted upon said guide rods, a piston for each supply hopper having connection with said weight, means for elevating said weight and the pistons connected therewith and means for locking the weight and pistons in their elevated positions.

6. A hot tamale forming machine comprising a casing having two independent cylinders arranged side by side, a screw conveyor within each cylinder, a receiving hopper for each cylinder, a supply hopper for each receiving hopper, one supply hopper adapted to contain meat and the other meal, a discharge nozzle for each casing cylinder and one of said nozzles being disposed within the other nozzle and spaced therefrom to provide a passage therearound, a pair of guide rods supported by the casing, a collar fixed to the upper ends of the supply hoppers through which said rods pass, a cross-bar for uniting the rods at their upper ends, a weight slidably mounted upon said guide rods, a piston for each supply hopper having connection with said weight, a cross shaft, bearings directed from the aforesaid collar, within which said shaft is journaled, a pulley fixed to said shaft, a cable connected at one end to said pulley and at its opposite end to said weight, a pulley carried by the aforesaid cross bar over which said cable rides, a handle for said shaft, a ratchet wheel fixed to said shaft, a yieldable plunger for contact with said ratchet wheel and means for releasing said plunger from contact with the ratchet wheel.

In testimony whereof I have hereunto affixed my signature.

SAMUEL ALLEN.